March 5, 1968

E. D. CUDMORE ETAL 3,371,861

DEMAND CONTROL APPARATUS

Filed Oct. 19, 1965

Inventors:
Elma D. Cudmore and
John G. Cudmore
By Darbo, Robertson &
Vandenburgh Attys.

March 5, 1968  E. D. CUDMORE ET AL  3,371,861
DEMAND CONTROL APPARATUS
Filed Oct. 19, 1965  2 Sheets-Sheet 2
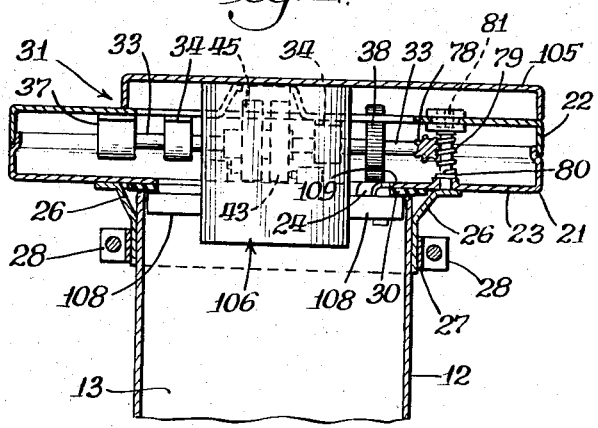
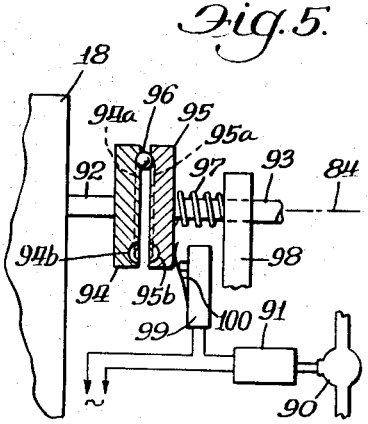
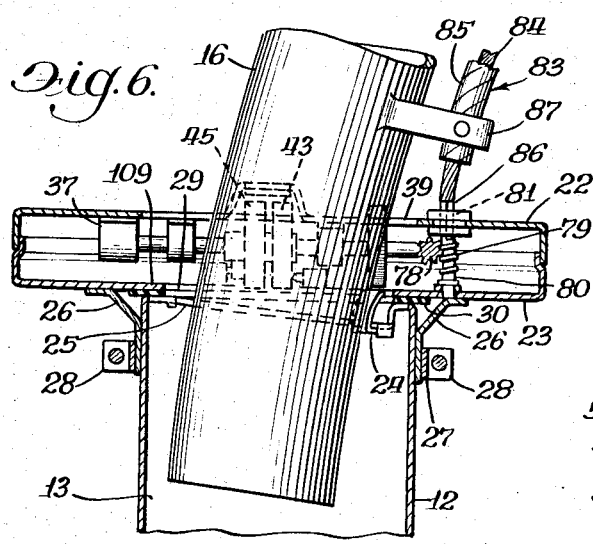
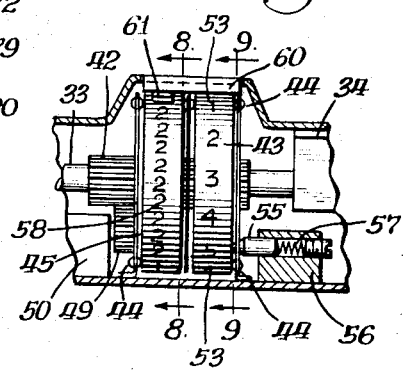
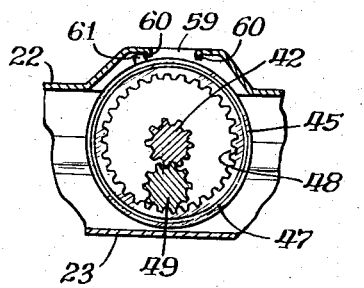
Inventors:
Elma D. Cudmore and
John Y. Cudmore
By Darbo, Robertson &
Vandenburgh
Attys.

United States Patent Office 3,371,861
Patented Mar. 5, 1968

3,371,861
DEMAND CONTROL APPARATUS
Elma D. Cudmore and John G. Cudmore, both of 1255 Valley, Bannockburn, Ill.
Filed Oct. 19, 1965, Ser. No. 498,037
11 Claims. (Cl. 235—132)

The present invention relates to a demand control mechanism for use on a fluid container such as the gasoline tank of an automotive vehicle, and the following disclosure thereof is offered for public dissemination upon the grant of a patent therefor.

Many operators of automotive vehicles which are left in parking lots or the like for a period of time would appreciate the convenience of having the parking lot proprietor put a prescribed amount of gasoline into the tank during the period of time that the vehicle is parked. This would save the vehicle operator the time and trouble of himself driving the vehicle to a gasoline station and of waiting while the gasoline is put into the tank (often including waiting time for other vehicles to move away from the pumps). For the parking lot proprietor the additional gasoline business would provide a desirable source of revenue. While the parking lot may have gasoline delivery facilities, the parking patrons often are in too much of a rush when entering or leaving the parking lot to purchase gasoline at that time.

Two principal difficulties ordinarily impair the ability of the proprietor to develop a business wherein the gasoline is delivered at a time other than that which takes place when the vehicle operator is present. In the first place, the desired quantity of gasoline must be communicated from the operator to the proprietor. The operator may not have time to do this, and the proprietor may forget just what the communication was before the proprietor has free time in which to service the vehicle. Secondly, unless the operator knows the proprietor and his employees sufficiently well to place a modicum of trust in them, the operator needs some assurance that the gasoline that he has paid for will be put into the tank of his car, rather than into another car or container or not delivered at all. The principal purpose of the present invention is to provide an apparatus that will enable such business to be transacted without difficulty. The present invention provides an indicating means to enable the vehicle operator to indicate how much gasoline he desires, i.e., the demand. Means are also provided to indicate the quantity of gasoline that has been delivered to the vehicle. Thus, the operator can be assured that he has received the gasoline for which he is being charged.

Many vehicle operators would like to keep a record of the gasoline used for the purpose of determining the miles per gallon obtained with the vehicle, for the purpose of keeping operating cost records, etc. The present invention provides a running cumulative total of the gasoline put into the tank of the vehicle and, thus, supplies this desired information to the vehicle operator.

A further advantage of embodiments of the present invention is that the attendant need not be present during the time that the tank is a actually being filled to assure that only the desired quantity of gasoline is put into the tank. Many of the gasoline dispensing pumps have automatic shutoff nozzles which will discontinue the flow of the gas when the tank is approximately full. However, these will not work to shut off the flow of gasoline when there is no back pressure such as would be the case if the tank were only approximately three-quarters full, for example. Thus, if the operator requests less gasoline than will fill the tank of the vehicle, embodiments of the present invention will take care of the situation, without the presence of an attendant, by shutting off the flow of the gasoline when the desired quantity has been delivered, despite the fact that the tank may not yet be anything like full.

Another important attribute of an apparatus that will be usable for the purposes heretofore explained is that it not be relatively expensive. Fluid metering and measuring devices invariably are of such a nature that they cannot be produced in embodiments that are in the comparatively inexpensive category. However, the present invention solves this problem and enables embodiments to be produced and sold in a price range that is not prohibitive by utilizing the measuring and computing apparatus already existing in the gasoline pump. Thus, the demand and delivery indicators that are mounted on the vehicle are connected, as by means of a flexible shaft, to the delivery indicating apparatus of the gasoline pump.

While the description herein is primarily directed toward the use of embodiments of the invention in connection with the delivery of gasoline to an automotive vehicle, it should not be inferred that this is the only application. Another use that might be made of embodiments of the invention would be in connection with the delivery of fuel, e.g., heating oil, butane gas, etc., to a home or factory for heating or other purposes. It is quite common for such delivery vehicles to have fuel measuring and computing apparatus to which embodiments of the present invention could be coupled in the same manner as they are coupled to the computing and measuring apparatus of gasoline pumps.

Embodiments of the present invention also provide a lockable cover to prevent unauthorized access to the tank. It also provides unauthorized access to the setting of the demand indicator so that a prankster cannot set the demand indication at something other than that desired by the vehicle operator.

Further objects and advantages will become apparent from the following description taken in conjunction with the drawings in which:

FIGURE 4 is a section as viewed at line 4—4 of FIGURE 2;

FIGURE 5 is a schematic view of a portion of the delivery control apparatus utilized in the gasoline pump of FIGURE 1;

FIGURE 6 is a section similar to FIGURE 4 but with the cap removed and the tank being filled with gasoline as in FIGURE 1;

FIGURE 7 is an enlarged partial section similar to a portion of FIGURE 3;

FIGURE 8 is a partial section as viewed along line 8—8 of FIGURE 7; and

FIGURE 9 is a partial section as viewed along line 9—9 of FIGURE 7.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Figure 1:
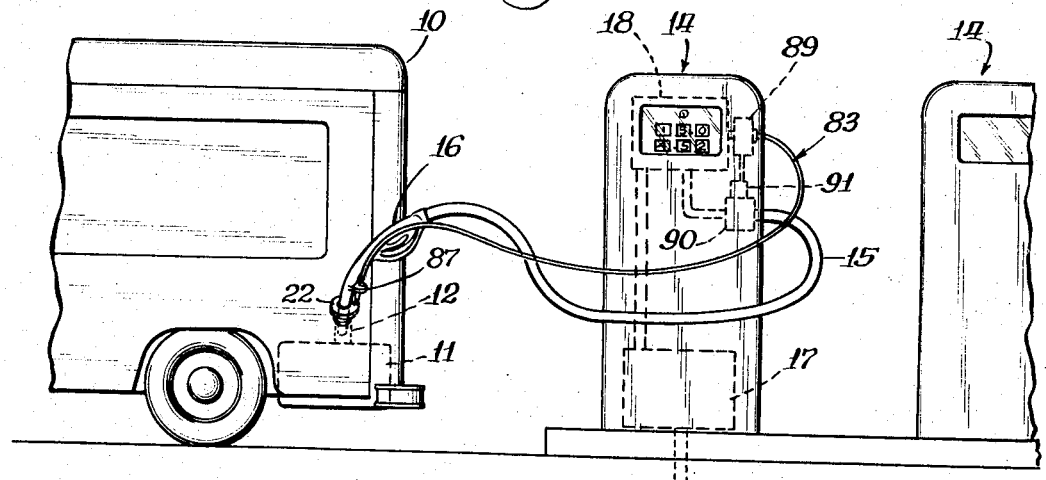
FIGURE 1 is an elevational view of the present invention being utilized in connection with a motor vehicle and gasoline pump.

FIGURE 1 illustrates an automotive vehicle 10 having a gasoline tank 11 which is filled through a filler tube 12. Tube 12 has an internal opening 13. The filling is done by a filling apparatus such as a gasoline pump 14 having a delivery hose and nozzle 15 and 16 respectively. The gasoline is drawn from an underground tank (not shown) by a pump 17 and passed through a measuring and computing means 18 during its course of travel to hose 15. The measuring and computing means 18 determines the amount of gasoline delivered and computes the price of that amount of gasoline.

The present invention includes a body 21 that is secured to the top of filler tube 12. Body 21 comprises mating top and bottom sections 22 and 23 affixed together. Bottom section 23 has two inwardly extending hooks 24 which engage cams 25 normally present on the top of such a filler tube to hold the conventional gas tank cap in place. In addition, bottom section 23 has some downwardly extending supports 26 which bear against the outside of tube 12 and are held in place by a circumferential band 27 tightened by screws 28. The exact manner of holding body 21 to tube 12 may vary from embodiment to embodiment. Bottom section 23 has a central opening 29 which registers with opening 13 in filling tube 12. A gasket 30 is interposed between the bottom of body 21 and the top of filling tube 12.

Within body 21 is a demand indicating means generally 31 and a delivery indicating means generally 32. Demand means 31 comprises a shaft 33 journaled in bearings 34. At one end of shaft 33 is secured a bevel gear 35. At the other end the shaft has a bulbous head 36 receivable in a clip 37 in one or the other of two positions. A hand wheel 38 is affixed to shaft 33 with the top of the hand wheel protruding through an opening 39 in top section 22.

An elongated gear 42 forms a part of shaft 33. A units indicating wheel 43 has internal teeth which fit about the teeth of gear 42 in the manner of a spline fit. Gear 42 can move longitudinally within wheel 43. Captive ball bearings 44 (FIGURE 7) support wheel 43 as well as a tens indicating wheel 45. Wheels 43 and 45 have races 46 and 47 respectively to receive balls 44. Indicating wheel 45 has teeth 48 in the form of an internal ring gear. Teeth 48 mesh with the teeth of a gear 49. Gear 49 also meshes with gear 42. The ratio is such that indicating wheel 45 rotates approximately one-third of a turn for each revolution of shaft 33 and indicating wheel 43. Gear 49 has a stub shaft journaled in block 50 of bottom section 23 to support the gear.

Wheel 43 has suitable indicia 53 thereon. Associated with the position of indicia 53 is a plurality of depressions 54 in the side of wheel 43. These depressions are positioned to be engaged by a detent 55 mounted in a block 56 and urged toward wheel 43 by a spring 57. Wheel 45 has indicia 58 thereon. Top section 22 forms a window 59 through which the indicia can be read. At the sides of the window are flanges 60. Wheel 45 has a protruding lug 61 which engages one of flanges 60 when the two wheels 43 and 45 are in the O position (see FIGURE 8). From the FIGURE 8 position the demand wheels can be rotated in the direction such that an increased demand appears on the wheels, but they cannot be rotated in the demand decreasing direction.

The delivery indicating means 32 comprises a shaft 64 journaled in bearings 65. A bevel gear 66 is secured to one end of shaft 64. Mounted on shaft 64 are a series of counting wheels comprising a unit wheel 67, a tens wheel 68, a hundreds wheel 69 and a thousands wheel 70. These are interconnected in the conventional manner so that for each revolution of shaft 64 and of units wheel 67, the tens wheel 68 rotates one step; for each rotation of tens wheel 68, the hundreds wheel 69 moves one step; and so forth. These wheels are viewed through a window 71 in top section 22.

A drive apparatus interconnects the measuring and computing means 18 of pump 14, the demand indicating means 31 and the delivery indicating means 32. This drive apparatus has a first portion generally 73 mounted in body 21. Portion 73 comprises a shaft 74 journaled in bearings 75. Shaft 74 has bevel gears 76 and 77 at the two ends thereof. Gear 76 meshes with gear 66, and gear 77 normally engages gear 35. A gear 78 is secured to shaft 74 intermediate the ends thereof. Gear 78 engages a gear 79 forming a part of a vertical shaft 80 journaled in body 21. The upper end of shaft 80 forms the socket 81, or the female portion of a plug and socket connection.

The second portion generally 83 of the drive apparatus includes a flexible shaft 84 in a sheath 85. Secured to shaft 84 is the plug 86 which is receivable in socket 81. Sheath 85 is held in a bracket 87 on spout 16. The arrangement of the parts is such that plug 86 only can be inserted into socket 81 when spout 16 is inserted into filling tube 12. If the spout 16 is not in filling tube 12, it is impossible to get plug 86 into a position in which it can be inserted into socket 81.

Flexible shaft 84 is connected to the measuring and computing apparatus 18 of pump 14, the arrangement being such that for each gallon delivered, as determined by the measuring and computing apparatus 18, flexible shaft 84 will rotate to an extent such as to cause one revolution of shafts 33 and 64. However, for reasons that will subsequently be apparent, the connection between flexible shaft 84 and apparatus 18 is through a control device generally 89. Control device 89 exercises control over a valve 90 interposed in the path of gasoline flow to hose 15.

Valve 90 is electrically operated by an electric valve operator 91. This arrangement is illustrated schematically in FIGURE 5. A shaft 92 is driven by the measuring and computing means 18. Shaft 92 normally drives a shaft 93 which in turn is connected to flexible shaft 84. This drive is through a slip clutch comprising plates 94 and 95 and a ball 96. Plates 94 and 95 have ball races 94a and 95a respectively and ball sockets 94b and 95b respectively. Plate 95 is urged towards plate 94 by a spring 97 in compression between the plate and abutment 98. An electric switch 99 has an actuator 100 positioned to close the switch when ball 96 is unseated. This unseated position is illustrated in FIGURE 5. In the normal course of events, ball 96 is received in sockets 94b and 95b, in which situation plate 95 is more closely adjacent to plate 94 under the urging of spring 97. However, when the rotation of flexible shaft 84 is stopped and shaft 92 endeavors to continue to rotate, ball 96 becomes unseated with plate 95 moving to the right in FIGURE 5 and actuating switch 99. This actuation of switch 99 closes the switch to energize valve operator 91 and close valve 90. When ball 96 reseats, plate 95 moves to the right, and switch 99 returns to the unactuated position. This opens the switch, de-energizing operator 91 and permitting valve 90 to open.

Figure 2:
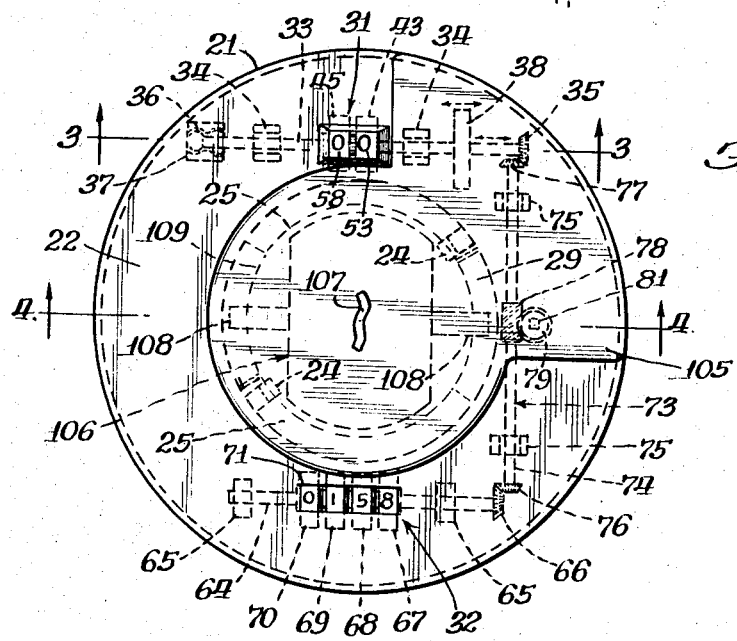
FIGURE 2 is a plan view of the special demand indicating and registering cap secured to the filling tube of the vehicle of FIGURE 1.
Figure 3:
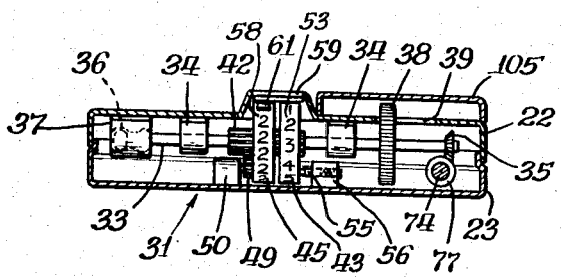
FIGURE 3 is a section as viewed at line 3—3 of FIGURE 2.

A cap 105 forms a closure for the top of the gas tank. As best seen in FIGURES 2 and 3, cap 105 also has a portion which covers hand wheel 38 so as to prevent access to the hand wheel when the cap is in place. The cap has a lock mechanism 106 operated by a key inserted through keyhole 107. In the locked position a pair of bars 108 are extended between cams 25 and under the lip 109 formed by bottom section 23 about central opening 29. Thus, the cap 105 cannot be lifted off when the apparatus is in the locked position. Furthermore, the body 21 cannot be removed because the bars 108 prevent rotation of the body sufficiently to disengage hooks 24 from cams 25. When the lock is turned by a key to the unlocked position, bars 108 are retracted so as to clear lip 109 and permit the cap to be lifted from the body.

Before leaving his auto 10 at a parking lot, the operator (after cap 105 was removed) engages hand wheel 38 with his fingers and moves the hand wheel and shaft to the right in FIGURES 2 and 3. Head 36 of shaft 33 would be slipped into the second of its sockets in clip 37. Gear 35 would disengage from gear 77. Hand wheel 38 would then be rotated, in a clockwise direction as viewed in FIGURE 9, until the amount of gasoline which the operator desired to have added to the tank appeared in window 59. The rotation of hand wheel 38 in the clockwise direction would rotate shaft 33 and units wheel 43 in the same direction, while tens wheel 45 would rotate in the opposite or counterclockwise direction is viewed in FIGURE 8. The operator then would move hand wheel 38 and shaft 33 to the left, to the original position illustrated in FIGURES 2 and 3.

When time was available, the parking lot proprietor, or his employees, would observe the demand indicator on the various vehicles in the lot. Upon seeing one where the demand indicator, as viewed through window 59, called for the addition of gasoline, that vehicle would be moved to the gasoline pump 14. As an alternative, the parking lot proprietor might have a mobile pumping apparatus similar to the fuel oil delivery trucks having a metering and computing apparatus thereon. In any event, the operator would remove cap 105 and insert nozzle 16 into the tank opening, while at the same time inserting plug 86 into socket 81.

As the gasoline was delivered, the measuring and indicating apparatus 18 would rotate flexible shaft 84 which, in turn, would rotate shafts 74, 64 and 33. Shaft 33 would be rotated in a counterclockwise direction as viewed in FIGURES 8 and 9. Shaft 64 also would rotate counterclockwise (as viewed in the same direction). When the demand indication of the demand indicating means 31 returned to O, lug 61 would engage flange 60 to stop the rotation of the apparatus and of flexible shaft 84. As previously explained, the stopping of the rotation of flexible shaft 84 would cause the slip clutch of FIGURE 5 to disengage, actuating switch 99 and closing valve 90. Thus, no further gasoline would be delivered to nozzle 16 and tank 11.

The amount of gasoline that had been added to the tank would have been added to the quantity shown on the delivery indicating means 32. This, of course, is visible through a window 71 in top section 22. Of course, if the control valve on nozzle 16 shut off (perhaps indicating a full tank) before the complete amount was subtracted from the demand indicating means 31, this fact would appear on the demand indicating means as well as by reason of the fact that the delivery indicating means 32 would only increase by the exact amount of gasoline actually dispensed. After the dispensing operation was completed, the proprietor would remove nozzle 16 and plug 81 and replace cap 105.

We claim:

1. A mechanism for use with a fluid container having a fill opening, which container is filled from a source of fluid by a filling apparatus having a rotating measuring means, said mechanism including: a body adapted to be mounted adjacent said opening and apart from said apparatus; demand means attached to said body and adjustable to be preset to indicate the desired quantity of fluid to be added to said container; delivery indicating means mounted on said body to register the accumulated total of the fluid added to said container; and drive apparatus detachably connected to said filling apparatus and connected to said means, said drive apparatus including means, when said filling apparatus is supplying fluid, effective to subtract from the indication on the demand means and to add to the indication on the delivery indicating means the amount of fluid measured by said measuring means.

2. A mechanism as set forth in claim 1, wherein said drive apparatus comprises two portions with a detachable connection therebetween, one of said portions being attached to said body.

3. A mechanism as set forth in claim 2, wherein the other portion is a rotatable flexible shaft connected to said measuring means, said detachable connection comprising a female member and a male member receivable therein.

4. A mechanism as set forth in claim 3 for use wherein said filling apparatus has a fill spout receivable in said fill opening, one of said members being affixed to said spout and the other member being affixed to said body, said members being so oriented that the male member is only received in the female member when said spout is in said opening.

5. A mechanism as set forth in claim 2, wherein said demand means includes a rotatable units indicating wheel, a rotatable tens indicating wheel, and a manually engageable setting wheel, said setting wheel being operatively connected to said indicating wheels to enable a person to rotate said indicating wheels to a desired quantity setting, said demand means including means to permit said person to disengage the connection between the demand means and said one portion while making said setting, said delivery indicating means including a plurality of totalizing wheels.

6. A mechanism as set forth in claim 5, wherein said body extends about said fill opening and has a body opening registering with said fill opening, including a closure for said body opening, said closure having locking means to prevent the unauthorized removal of the closure, said closure having a portion to prevent access to said setting wheel when said closure is in place on said body.

7. A mechanism as set forth in claim 6, wherein said demand means includes a first rotatable shaft across one side of said body opening and having a first gear on one end thereof, said setting wheel being secured to said shaft; said indicating means includes a second rotatable shaft across the opposite side of said body opening and having a second gear on the corresponding end of the second shaft; and said one portion including a third rotatable shaft extending between said two gears and having third and fourth gears meshing with said first and second gears respectively.

8. A mechanism as set forth in claim 2, wherein said demand means includes a first rotatable shaft across one side of said body opening and having a first gear on one end thereof, said setting wheel being secured to said shaft; said indicating means includes a second rotatable shaft across the opposite side of said body opening and having a second gear on the corresponding end of the second shaft; and said one portion including a third rotatable shaft extending between said two gears and having third and fourth gears meshing with said first and second gears respectively; one of said means including a manually operable device to enable the interconnection between the first and second shafts formed by said meshing gears to be disconnected.

9. A mechanism as set forth in claim 5 wherein said demand means includes a stop to prevent the rotation of said wheels in the subtraction direction beyond the point at which said demand indication is zero, and said drive apparatus includes means connected to said filling apparatus to stop the flow of fluid from the filling apparatus when said rotation of the wheels is prevented.

10. A mechanism as set forth in claim 1, wherein said means are effective to automatically stop the flow of fluid from said filling apparatus when said demand means indication has been reduced to zero.

11. A mechanism for use with a fuel tank having a filling tube with an opening therein, which tank is filled from a source of fluid by a filling apparatus having a rotating measuring means, said mechanism including: a body apart from said apparatus and adapted to be affixed to said tube and having an opening registering with said fill tube opening when so affixed; demand means attached to said body and adjustable to be preset to indicate the desired quantity of fluid to be added to said container; and drive apparatus detachably connected to said filling apparatus and connected to said means, said drive apparatus including means, when said filling apparatus is supplying fluid, effective to subtract from the indication on the demand means the amount of fluid measured by said measuring means.

References Cited

UNITED STATES PATENTS

| 2,307,435 | 1/1943 | Von Opel | 73—198 |
| 2,383,702 | 8/1945 | Berck | 235—132 |
| 2,954,925 | 10/1960 | Bliss et al. | 235—132 |

STEPHEN J. TOMSKY, *Primary Examiner.*